United States Patent
Christensen et al.

(10) Patent No.: US 8,583,180 B2
(45) Date of Patent: Nov. 12, 2013

(54) COMMUNICATION TERMINAL

(75) Inventors: Per Hartmann Christensen, Aalborg (DK); Bent Henneberg Rysgaard, Aalborg Oest (DK)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/334,090

(22) Filed: Dec. 22, 2011

(65) Prior Publication Data

US 2013/0165182 A1    Jun. 27, 2013

(51) Int. Cl.
    *H04B 1/00*    (2006.01)

(52) U.S. Cl.
    USPC .......................... 455/558; 455/575.1

(58) Field of Classification Search
    USPC ............. 455/558, 550.1, 73, 406, 410, 412.1, 455/575.1, 435.2
    See application file for complete search history.

(56) References Cited

U.S. PATENT DOCUMENTS

| | | | |
|---|---|---|---|
| 6,212,372 B1 * | 4/2001 | Julin | 455/418 |
| 6,868,282 B2 * | 3/2005 | Carlsson | 455/558 |
| 6,978,156 B1 * | 12/2005 | Papadopoulos et al. | 455/558 |
| 7,421,287 B2 * | 9/2008 | Cho et al. | 455/558 |
| 7,929,993 B2 * | 4/2011 | Nagarajan | 455/558 |
| 8,306,532 B2 * | 11/2012 | Rahman et al. | 455/435.1 |
| 2002/0154632 A1 * | 10/2002 | Wang et al. | 370/389 |

OTHER PUBLICATIONS

3GPP TS 45.001 V10.1.0 (Nov. 2011), 3rd Generation Partnership Project, Technical Specification Group GSM/EDGE Radio Access Network, Physical layer on the radio path, General description, (Release 10), pp. 1-44.

3GPP TS 45.002 V10.2.0 (Nov. 2011), 3rd Generation Partnership Project, Technical Specification Group GSM/EDGE Radio Access Network, Multiplexing and multiple access on the radio path, (Release 10), pp. 1-112.

* cited by examiner

*Primary Examiner* — Sonny Trinh

(57) ABSTRACT

According to one aspect of this disclosure, a communication terminal is provided comprising a subscriber identity module, wherein the subscriber identity module includes a plurality of subscriber identities assigned to identify the subscriber identity module.

22 Claims, 6 Drawing Sheets

COMMUNICATION TERMINAL

TECHNICAL FIELD

The present disclosure relates to a communication terminal.

BACKGROUND

When operating a communication terminal, the case may occur that the reception of two sets of information, which should both be received by the mobile communication terminal, has a conflict, e.g. due to the collision of the transmission timing of the two sets of information. Efficient ways to avoid and handle such conflicts are desirable.

SUMMARY

According to one aspect of this disclosure, a communication terminal is provided including a subscriber identity module, wherein the subscriber identity module includes a plurality of subscriber identities assigned to identify the subscriber identity module.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of this disclosure are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
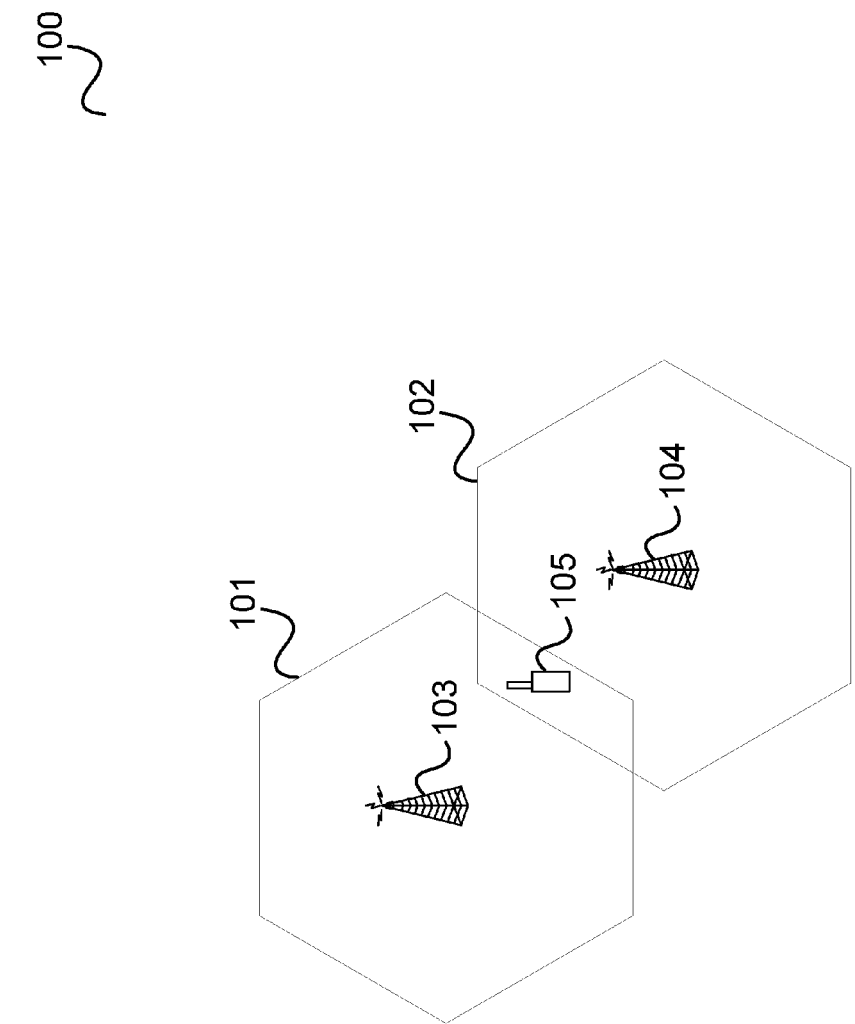
FIG. 1 shows a communication arrangement according to an aspect of this disclosure.

FIG. 1 shows a communication arrangement 100 according to an aspect of this disclosure.

The communication arrangement 100 includes a first radio cell 101 and a second radio cell 102. The first radio cell 101 is operated by a first base station 103 and the second radio cell 102 is operated by a second base station 104. The first base station 103 is for example part of a radio access network of a first mobile communication network and the second base station 104 is for example part of a radio access network of a second mobile communication network. It is assumed that the first mobile communication network and the second communication network are different mobile communication networks, e.g. are operated by different operators and/or require separate subscriptions.

The first mobile communication network and the second mobile communication network each may for example be a GSM (Global System for Mobile Communications) communication system, a UMTS (Universal Mobile Telecommunications System), a CDMA2000 (CDMA: Code Division Multiple Access) communication system or a FOMA (Freedom of Mobile Access) communication system.

The first radio cell 101 and the second radio cell 102 are assumed to overlap such that a mobile terminal 105 located in the overlap area of the first radio cell 101 and the second radio cell 102 can receive signals from both the first base station 103 and the second base station 104 and can use both the first communication network and the second communication network for communication.

For being able to use both the first communication systems and the second communication system, the mobile terminal 105 may include two (or more) subscriber identity modules, e.g. SIMs or USIMs (Universal Subscriber Identity Modules). In other words, the mobile terminal 105 may be a multi-SIM device supporting communication via two (or more) different mobile communication networks.

According to one aspect of this disclosure, the mobile terminal 105 is a multi-SIM device with only one RF (radio frequency) receiver. This means that the mobile terminal 105 is only able to receive data from either the first base station 103 or the second base station 104 at a time. For example, the mobile terminal 105 is only able to tune to a communication channel of either the first base station 103 or the second base station 104 at a time and/or is only able to tune to either the frequency range used by the first base station 103 for operating the first radio cell 101 or the frequency range used by the second base station 104 for operating the second radio cell 102. A RF receiver may be understood as a component of the mobile terminal 105 performing the reception processing of signals received via an antenna of the mobile terminal 105 processing up to including conversion into base band.

In such a scenario, conflicts may happen when the mobile terminal 105 tries to maintain communication services via both the first communication network and the second communication network, e.g. when the mobile terminal 105 should be reachable by incoming calls via both the first communication network and the second comunication network. Such conflicts may arise due to the requirement of receiving information from the first communication network (i.e. from the first base station 103) and the second comunication network (i.e. the second base station 104) at specific points in time and due to the duration of such reception periods. For example, in case that both the first communication network and the second comunication network are GSM communication systems, the mobile terminal may be required to listen to pagings (i.e. to the information of incoming calls) at specific points in time configured by the first communication network and the second comunication network. This is illustrated in FIG. 2.

Figure 2:
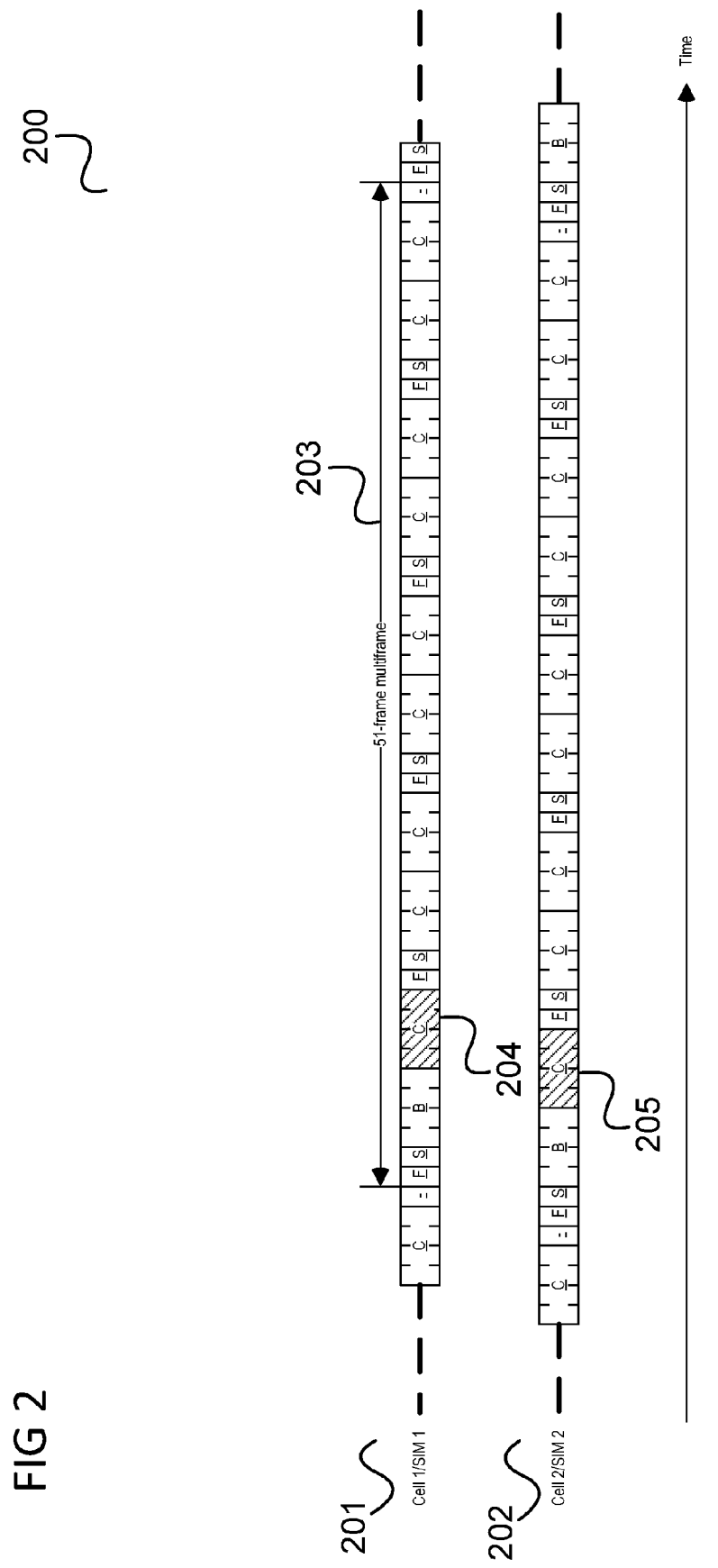
FIG. 2 shows a transmission diagram according to an aspect of this disclosure.

FIG. 2 shows a transmission diagram 200 according to an aspect of this disclosure.

A first transmission sub-diagram 201 illustrates the transmission of data from the first base station 103 and a second transmission sub-diagram 202 illustrates the transmission of data from the second base station 104. In this example, the transmissions are carried out according to a format according to GSM as specified by 3GPP (Third Generation Partnership Project).

The transmissions of data by the first base station 103 and the second base station 104 are structured into frames, wherein 51 consecutive frames form a 51-frame multiframe 203. Time is running from left to right.

Blocks of four frames marked with 'C' are allocated for sending paging information within the first radio cell 101 and the second radio cell 102. It should be noted that not all of the blocks marked with 'C' need to be allocated for sending paging information, e.g. depending on the allocation by the network. Thus, the case may occur that a first block 204 (shown with a hatching for better illustration) is used for sending paging information of the first mobile communication network to the mobile terminal 105 and a second block 205 (shown with a hatching for better illustration) is used for sending paging information of the second mobile communication network to the mobile terminal 105. The first block 204 and the second block 205 can be seen as the paging blocks allocated to the mobile terminal 105 for the first mobile communication network and the second mobile communication network, respectively. Since in this case, the transmissions overlap in time the mobile terminal 105, assumed to have only one RF receiver, may be able to receive the paging information of both mobile communication networks.

In other words, since the transmission timings of the paging channel of the first mobile communication network (blocks marked with "C" of the first transmission sub-diagram 201) overlap with the transmission timings of the paging channel of the second mobile communication network (blocks marked with "C" of the second transmission sub-diagram 202) there is a risk that the mobile terminal 105 misses paging information of one of the mobile communication networks or, in other words, the likelihood of receiving all the paging information addressed to the mobile terminal 105 is reduced. It should be noted that according to another aspect of this disclosure, the blocks marked with 'C' are used for other information such as broadcast information or signaling information. However, similarly to this example where there is a risk that paging information is missed there may be analogously the risk to miss other kind of information.

Also, the paging sub-channel (or, in other words, the frames allocated for the transmission of paging information) of one of the mobile communication networks may collide with another activity related to the other of the mobile communication networks, such as the transmission of system information, e.g. via the BCCH (Broadcast Channel), in one of the blocks marked with "B" in the transmission sub-diagrams 201, 202. If the paging sub-channel collides with too many occurrences of system information transmission, for example, the mobile terminal 105 may be prevented from reading enough system information to enter service on a radio cell 101, 102.

Such collisions may be handled by choosing which information the mobile terminal 105 should receive at each occurrence of a collision. The scheme for making such a choice can vary much, e.g. depending on what events (i.e. which transmissions) are colliding and will typically always be a compromise of some sort. Namely, for a dual-SIM, dual-standby mobile terminal only having one antenna, RF receiver and/or baseband processing circuit the choice made may result in the data of one of the mobile communication networks not being received.

According to one aspect of this disclosure, in accordance with 3GPP, the paging block assigned to the mobile terminal 105 is, for each of the mobile communication networks, determined by PAGING_GROUP (0 . . . N−1)=((IMSI mod 1000) mod (BS_CC_CHANS×N)) mod N where N is the number of paging blocks available on one CCCH (Common Control Channel), i.e. the (number of paging blocks available in a 51-frame multiframe 203 on a CCCH) times BS_PA_MFRMS wherein BS_PA_MFRMS is the number of 51-frame multiframes between paging transmissions to the same paging group;

IMSI is the International Mobile Subscriber Identity;

mod is the modulo operation; and

BS_CC_CHANS is the number of common control channels.

The parameters "number of paging blocks in a 51 multiframe", BS_PA_MFRMS and BS_CC_CHANS are for example broadcast in system information of the mobile communication network. Accordingly, it is hard to allow a range for these parameters, for example to allow the mobile terminal 105 to adapt paging timings.

However, according to one aspect of this disclosure, the mobile terminal 105 may select one of a plurality of IMSIs assigned for identification of one of the subscriber identity modules (or, equivalently, for identification of the mobile terminal 105) and by means of this selection, select the paging block assigned to the mobile terminal 105 for the mobile communication network associated with the subscriber identity module, i.e. the mobile communication network whose usage the subscriber identity module allows.

Figure 3:
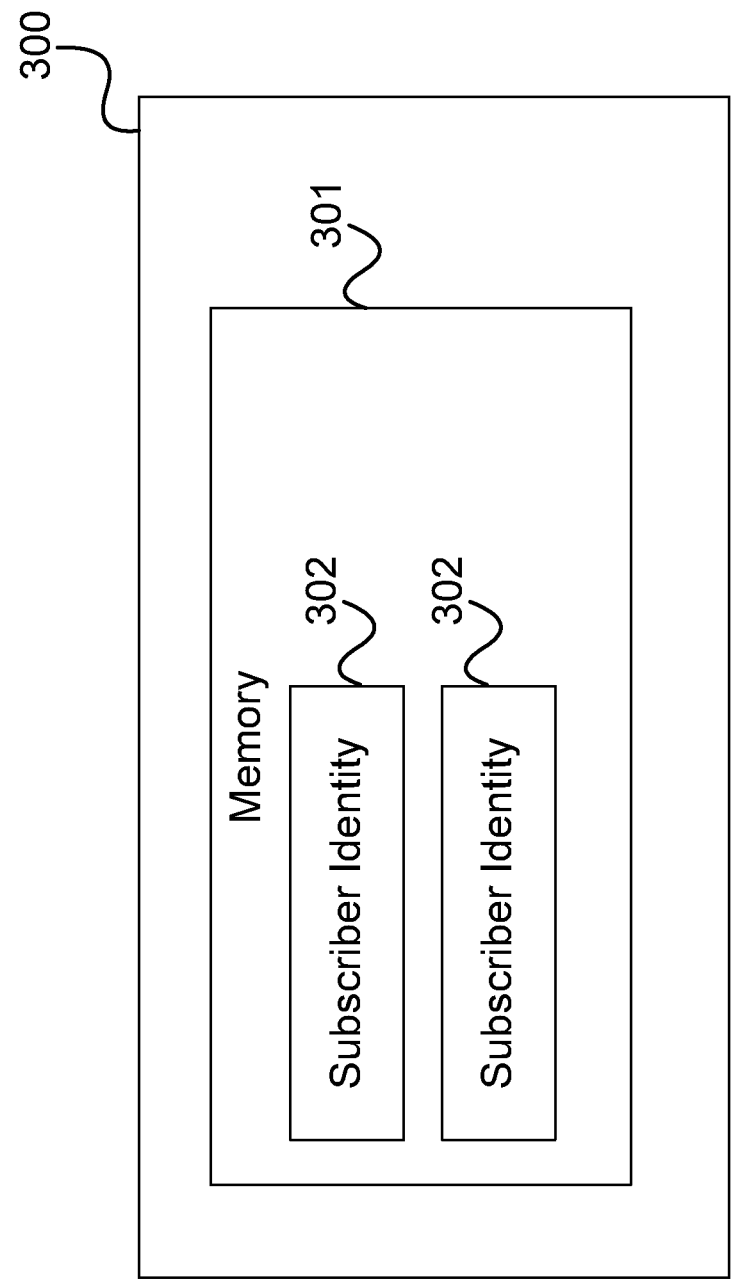
FIG. 3 shows a communication terminal according to an aspect of this disclosure.

Generally, according to one aspect of this disclosure, a communication terminal is provided as illustrated in FIG. 3.

FIG. 3 shows a communication terminal 300 according to an aspect of this disclosure.

The communication terminal 300 includes a memory 301, wherein memory 301 includes a plurality of subscriber identities 302 assigned to identify the communication terminal 300.

In other words, according to one aspect of this disclosure, a communication terminal is associated with a plurality of subscriber identities (in other words subscription identifications) identifying the communication terminal (e.g. being uniquely assigned to the communication terminal, e.g. by an operator of the mobile communication network associated with a subscriber identity module of the communication terminal), or, equivalently, identifying the subscription (or the user having made the subscription). For example, the memory may include a plurality of IMSIs or any other type of subscriber identifications, e.g. network access identifiers (NAIs). The subscriber identities may for example be included in a subscriber identity module which is for example implemented by a chip card including a storage storing the plurality of subscriber identities. It should be noted that according to an aspect of this disclosure, the IMSIs can be signaled directly or indirectly from the mobile communication network to the communication terminal so that no change of the subscriber identiy module of the communication terminal is needed. For example, the mobile communication network may sends a range based on a current IMSI of the communication terminal (e.g. currently selected for identifying the communication terminal) which can be used, for example "IMSI +/−5".

The plurality of subscriber identities may allow the communication terminal 300 to select one of the subscriber identities, e.g. select one of the subscriber identities which should be used by the mobile communication network associated with the communication terminal as an identification of the communication terminal (and thus the user of the communication terminal). This may allow the communication terminal to influence parameters that are determined based on the identification used by the mobile communication network for the communication terminal, for example, in case of an IMSI in a GSM communication system, the paging block that is assigned to the communication terminal 300. For example, a range of subscriber identities (e.g. IMSIs) may be included (e.g. added) to a subscriber identity module (e.g. to a SIM or USIM implemented by a SIM card or a UICC (Universal Integrated Circuit Card)) to allow the communication network to select one of the subscriber identities based on an evaluation of potential conflicts, e.g. to influence the paging block that is assigned to the communication terminal 300 to avoid a conflict e.g. arising due to overlapping paging timings between the mobile communication network associated with the subscriber identity module and another mobile communication network. Information about the plurality of subscriber identities assigned to the subscriber identity module may for example be stored in a core network of the mobile communication network associated with the subscriber identity module.

It should be noted that the communication terminal may include a plurality of subscriber identity modules which are implemented by one integrated circuit card. In other words, according to one aspect of this disclosure, a subscriber identity module is understood as an application implemented by an integrated circuit card (e.g. running and/or installed on the integrated circuit card) and a plurality of such applications can be implemented using the same integrated circuit card. In this case, a subscriber identity module including a plurality of subscriber identities may be understood as the subscriber identity module being associated with a plurality of subscriber identities which are assigned to identify the subscriber identity module and which are for example stored as part of the data (e.g. including the program code of the subscriber identity module), e.g. in a memory of the integrated circuit card.

According to one aspect of this disclosure, the subscriber identity module is uniquely associated with one or more a telephone numbers (for example using the "alternate line" feature of CPHS, i.e. the common PCS (Personal Communications Service) handset specification, which associates one IMSI with multiple numbers), i.e. one or more telephone numbers under which the communication terminal can be reached, e.g. from a mobile phone by dialing one of the telephone numbers. One aspect of this disclosure can be seen in that a plurality of subscriber identities (e.g. IMSIs) are associated with one telephone number.

According to one aspect of this disclosure, the communication terminal comprises a subscriber identity module wherein the subscriber identity module includes a plurality of subscriber identities and wherein the subscriber identities are assigned to identify the communication terminal by being assigned to identity the subscriber identity module.

According to one aspect of this disclosure, the communication terminal further includes an integrated circuit card wherein the subscriber identity module is stored on the integrated circuit card (e.g. a SIM card or a UICC).

According to one aspect of this disclosure, the plurality of subscriber identities are stored on a memory of the integrated circuit card. According to another aspect of this disclosure, the plurality of subscriber identities are signaled from the mobile communication network using a subscriber identity included in the subscriber identity module (e.g. stored in the integrated circuit card implementing the subscriber identity module) as a basis. The signaled subscriber identities may then be stored in the memory for later usage.

According to one aspect of this disclosure, the communication terminal is a mobile communication terminal, e.g. a mobile phone.

According to one aspect of this disclosure, the communication terminal further includes a selector configured to select one of the subscriber identities.

For example, the selector is configured to select the subscriber identity based on a predetermined criterion. The selector may be understood as any kind of a logic implementing entity, which may be special purpose circuitry or a processor executing software stored in a memory, firmware, or any combination thereof Thus, in an aspect of this disclosure, the selector may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). The selector may also be a processor executing software, e.g. any kind of computer program, e.g. a computer program using a virtual machine code such as e.g. Java. Any other kind of implementation of the respective functions may also be understood as a selector in accordance with an aspect of this disclosure.

The selector may be configured to select the subscriber identity depending on a desired timing of a data transmission with respect to a timing of another data transmission.

The selector may be configured to select the subscriber identity such that a timing of the data transmission associated with the subscriber identity does not collide with a timing of the other data transmission.

The selector may be configured to select the subscriber identity such that a timing of the data transmission associated with the subscriber identity overlaps with the timing of the other data transmission.

For example, at least one of the data transmission is the transmission of system information (e.g. broadcast within a radio cell, for example to signal operation parameters of the radio cell allowing access to the radio cell) or paging information.

The communication terminal may be a subscriber terminal of a mobile communication network and may further include a transmitter configured to transmit an indication of the selected subscriber identity to the mobile communication network.

For example, the transmitter is configured to indicate the selected subscriber identity as an identification to be used for the communication terminal in the mobile communication network.

According to one aspect of this disclosure, the data transmission is a data transmission between the communication terminal and a first mobile communication network and the other data transmission is a data transmission between the communication terminal and a second mobile communication network.

For example, the first mobile communication network and the second mobile communication network are different.

For example, the communication terminal includes a subscriber identity module wherein the subscriber identity module includes the plurality of subscriber identities and wherein the subscriber identity module is a subscriber identity module for using the first mobile communication network and the communication terminal further includes another subscriber identity module for using the second mobile communication network.

According to one aspect of this disclosure, the timing is associated with the subscriber identity by means of a predetermined rule such as for example in case of a GSM or a UMTS communication system.

According to one aspect of this disclosure, the communication terminal is a subscriber terminal of a mobile communication network in which a timing of a data transmission between the mobile communication network and the communication terminal is determined based on a subscriber identity used for the communication terminal in the mobile communication network. For example, the timing of the transmission of paging information (i.e. the paging block assigned to the communication terminal) is determined based on the IMSI that is used for the communication terminal.

According to one aspect of this disclosure, the subscriber identities are International Mobile Subscriber Identities (IMSIs).

The IMSI of a mobile terminal is typically included in the (U)SIM and is stored in the mobile communication network associated with the (U)SIM and is only exchanged between the mobile terminal and the mobile communication network when absolutely needed, for example during attach of the mobile terminal to the mobile communication network. According to one aspect of this disclosure, the (U)SIM (or the mobile communication network) gives a range of IMSIs for the mobile terminal to use and the mobile terminal makes a calculation of possible collisions between paging and other activities (e.g. reception of system information and/or paging from another mobile communication network) and chooses the IMSI that fits best to avoid the collisions, e.g. by choosing an IMSI resulting in a paging block assigned to the mobile terminal such that paging does not collide with another activity. For example, when paging is spread on multiple paging sub-channels, an IMSI may be selected that results in a paging sub-channel (e.g. including a certain paging block in a 51-frame multiframe) that does not collide with other activities.

When the mobile terminal has selected an IMSI, the mobile terminal can for example do a location update to synchronize the selected IMSI with the mobile communication network as an IMSI used by the mobile terminal and the mobile communication network. Thus, for example, the mobile communication network is enabled to send paging information to the mobile terminal on the correct paging sub-channel, e.g. the paging sub-channel that the terminal is listening on and that was selected (by selecting the IMSI correspondingly) such that collisions with other activities are avoided.

An example according to an aspect of this disclosure is described in the following with reference to FIG. 4.

Figure 4:
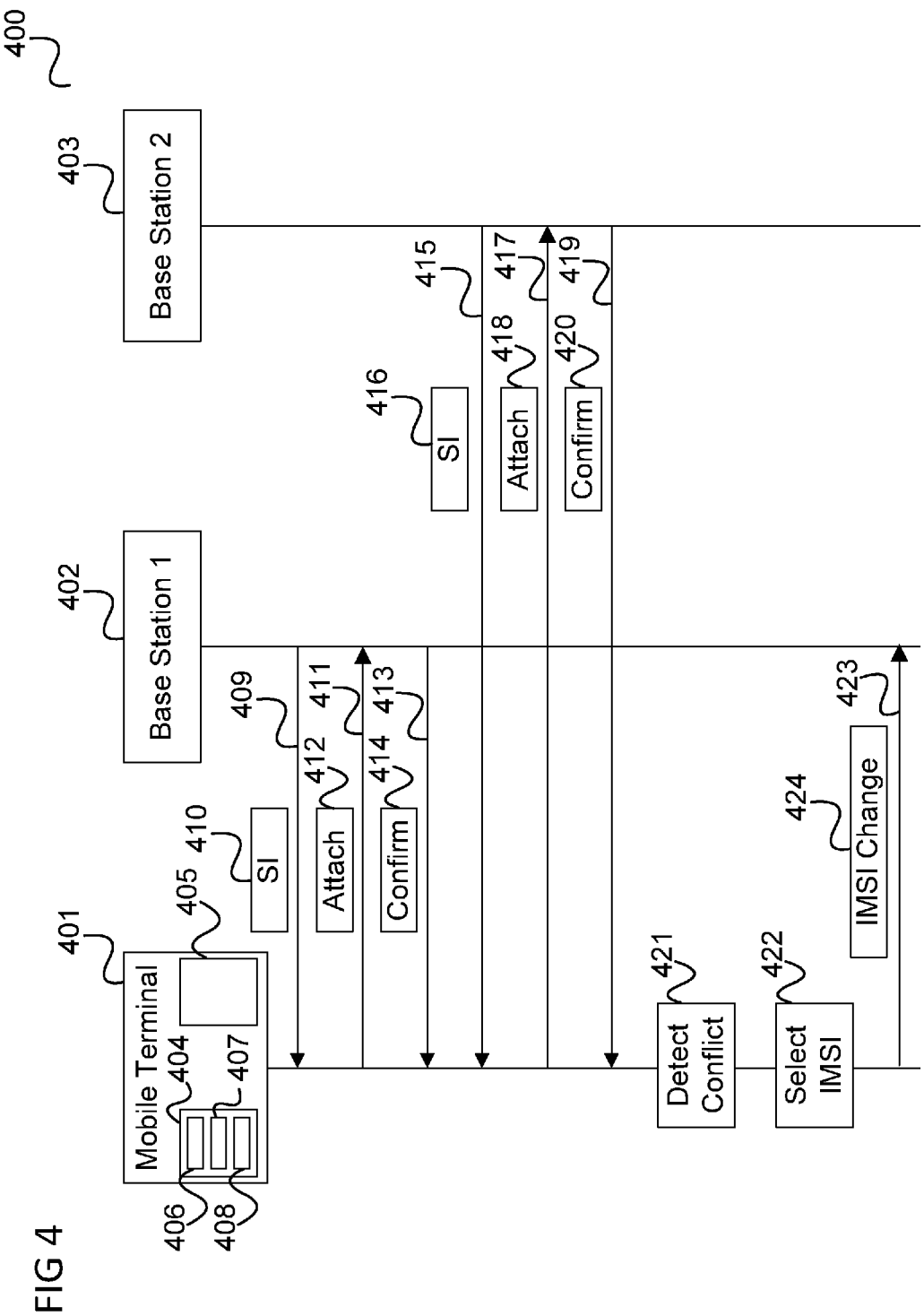
FIG. 4 shows a flow diagram according to an aspect of this disclosure.

FIG. 4 shows a flow diagram 400 according to an aspect of this disclosure.

The flow takes place between a mobile terminal 401, e.g. corresponding to the mobile terminal 105 of the communication arrangement 100 illustrated in FIG. 1, a first base station 402, e.g. corresponding to the first base station 103 of the communication arrangement 100 illustrated in FIG. 1, and a second base station 403, e.g. corresponding to the second base station 104 of the communication arrangement 100 illustrated in FIG. 1.

It is assumed that the mobile terminal 401 includes a first subscriber identity module 404 associated with the first mobile communication network (to which the first base station 402 belongs) and includes a second subscriber identity module 405 associated with the second mobile communication network (to which the second base station 403 belongs). Similar to the subscriber identity module 301 of the communication terminal 300 described with reference to FIG. 3, the first subscriber identity module is assumed to include a plurality of subscriber identities 406, 407, 408, in this example IMSIs, assigned to identify the first subscriber identity module 404 (e.g. by an operator of the first mobile communication network). The plurality of subscriber identities may be directly stored in the subsccriber identity module 404 as shown in FIG. 4 or, alternatively, the subscriber identities may be derived by the mobile terminal 401 based on network signaling based on a single subscriber identity which is stored in the subsccriber identity module 404.

In 409, the mobile terminal 401 receives system information (SI) of the first mobile communication network 410 from the first base station 402, e.g. after being switched on.

In 411, the mobile terminal 401 attaches itself to the first mobile communication network by sending a first attach message 412 to the first base station 402. The first attach message 412 includes, in this example, an indication of the first IMSI 406 of the plurality of IMSIs 406, 407, 408 of the first subscriber identity module 404, which is for example chosen as default.

In 413, the first base station 402 confirms the attachment to the first mobile communication network by sending a first confirmation message 414 to the mobile terminal 401.

It is assumed that the user of the mobile terminal 401 also wants to be attached to the second mobile communication network to be reachable via the first mobile communication network (e.g. under a first telephone number) as well as via the second mobile communication network (e.g. under a second telephone number). The first base station 402 and the second base station 403 may also be the same base station such that for example the mobile terminal 401 can be reached under two different telephone numbers via the same mobile communication network.

Accordingly, in 415, the mobile terminal 401 receives system information of the second mobile communication system 416 from the second base station 403.

Further, the mobile terminal 401 sends, in 417, a second attach message 418 to the second base station 403. The second attach message 418 includes an IMSI of the second subscriber identity module 405. The second base station 403 confirms the attachment to the second mobile communication network by sending, in 419, a second confirmation message 420.

It is assumed that the paging of the first mobile communication network is carried out in accordance with the first transmission sub-diagram 201 shown in FIG. 2 and that the paging of the second mobile communication network is carried out in accordance with the second transmission sub-diagram 202 shown in FIG. 2. Specifically, it is assumed that the first paging block 204 is allocated for paging the mobile terminal 401 for the first mobile communication network and that the second paging block 205 is allocated for paging the mobile terminal 401 for the second mobile communication network such that there is a conflict between the paging timings of the two mobile communication networks.

In 421, the mobile terminal 401 detects the conflict between these paging timings. The mobile terminal 401 may for example calculate the paging timings based on the first IMSI 406 of the first subscriber identity module and the IMSI of the second subscriber identity module.

In 422, the mobile terminal 401 selects a different IMSI of the plurality of IMSIs 406, 407, 408 to solve the conflict. For example, the mobile terminal 401 determines that based on the third IMSI 408 of the plurality of IMSIs 406, 407, 408 of the first subscriber identity module 404 a paging timing would be allocated to the mobile terminal 401 by the first mobile communication network such that there would be no conflict between the paging timings of the first mobile communication network and the second mobile communication network.

It should be noted that an IMSI may already be selected after the system information has been received (in this example in 409 and 416) since based on this information, the mobile terminal 401 can determine whether there will be a collision or not. In other words, the attach etc. is not necessarily carried out before selecting the IMSI, i.e. the selection of the IMSI can happen (possibly much) earlier. However, an attach may be needed if the IMSI selected is changed compared to the one used before.

Figure 5:
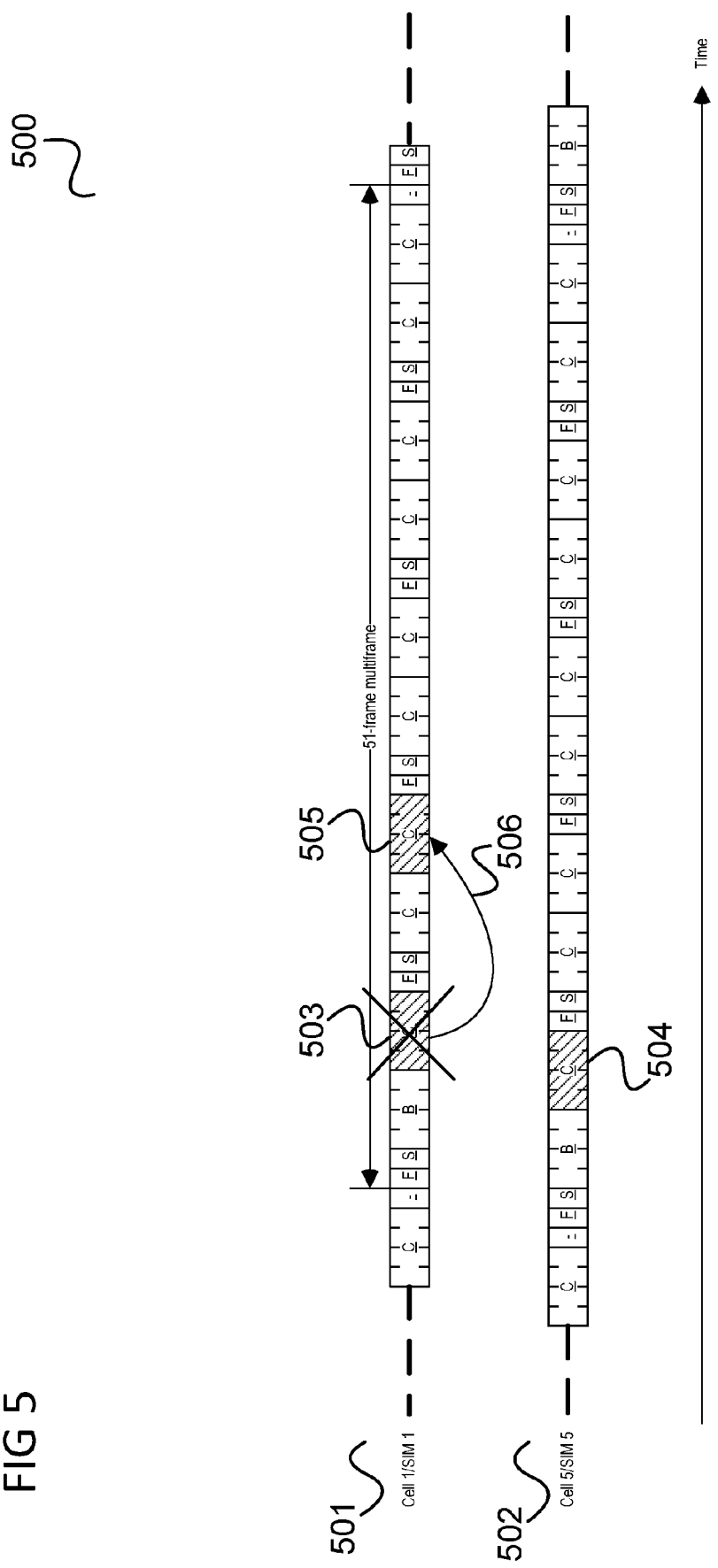
FIG. 5 shows a transmission diagram according to an aspect of this disclosure.

This is illustrated in FIG. 5.

FIG. 5 shows a transmission diagram 500 according to an aspect of this disclosure.

Similarly to the transmission diagram 200, in the transmission diagram 500, a first transmission sub-diagram 501 illustrates the transmission of data from the first base station 402 and a second transmission sub-diagram 502 illustrates the transmission of data from the second base station 403.

A first paging block 503 is assumed to be assigned to the mobile terminal 401 for paging by the first mobile communication network based on the first IMSI 406 of the first subscriber identity module and a second paging block 504 is assumed to be assigned to the mobile terminal for paging by the second mobile communication network according based on the IMSI of the second subscriber identity module.

It is further assumed that the mobile terminal 401 determines that based on the third IMSI 408, a third paging block 505 would be assigned for paging by the first mobile communication network. Since the third paging block 505 does not collide with the second paging block 504, the mobile terminal 401 therefore selects the third IMSI 408.

In 423, the mobile terminal 401 sends an IMSI change message 424 to the first base station 402 to change the IMSI that is used by the first mobile communication network for the first subscriber identity module 404. Accordingly, the paging timing for the mobile terminal 401 is changed by the first mobile communication network. The mobile terminal 401 can thus be seen to shift the paging block allocated for the paging by the first mobile communication network from the first paging block 503 to the third paging block 505 as indicated by arrow 506.

The IMSI change message 424 is for example a location update message according to one aspect of this disclosure. According to another aspect of this disclosure, the IMSI change message 424 may be a dedicated message for indicating an IMSI or a change of an IMSI to be used for the mobile terminal 401.

It should be noted that while in the above example, the first subscriber identity module 404 has a plurality of IMSIs and the IMSI of the first subscriber identity module 404 is changed the second subscriber identity module 405 may also include a plurality of IMSIs and the IMSI of the second subscriber identity module 405 may be changed instead or in addition. For example, both the IMSI of the first subscriber module 404 and the second subscriber module 405 may be changed, e.g. to avoid collisions of paging with, for example, BCCH reception, cell broadcast, etc, possibly in addition of avoiding collisions between the pagings for the two subscriber identity modules 404, 405.

It should be noted that while in the aspects of this disclosure described above, collisions have been avoided by setting transmission timings (e.g. paging timings) such that they do not collide according to an alternative aspect of this disclosure, transmission timings are deliberately set to overlap with each other. For example, depending on the capabilities of communication terminal 401, a strategy could be (e.g. under good radio conditions) to align the paging block allocated for the paging by the first mobile communication network with the paging block allocated for the paging by the second mobile communication network such that these paging blocks overlap. Thus, depending on the communication terminal's capabilities, the communication terminal may be able to receive the paging information of both mobile communication networks in parallel which may for example allow saving power.

Figure 6:
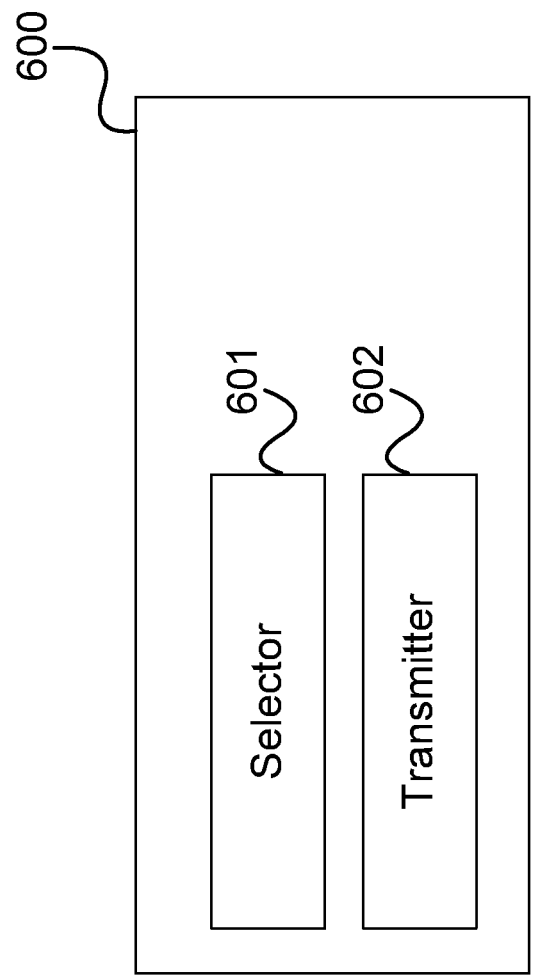
FIG. 6 shows a communication terminal according to an aspect of this disclosure.

In other words, according to one aspect of this disclosure, a communication terminal is provided as illustrated in FIG. 6.

FIG. 6 shows a communication terminal 600 according to an embodiment.

The communication terminal 600 includes a selector 601 configured to select one of a plurality of subscriber identities based on a predetermined criterion.

The communication terminal 600 further comprises a transmitter 602 configured to transmit an indication of the selected subscriber identity to a mobile communication network as a subscriber identity to be used as subscriber identity of the communication terminal by the mobile communication network.

According to one embodiment, in other words, a communication terminal has a plurality of subscriber identities at its disposal (e.g. signaled from the mobile communication network or stored on a subscriber identity module of the communication terminal) and the communication terminal selects an subscriber identity to be used for it, for example to influence the timing of a plurality of data transmissions to the communication terminal (e.g. to avoid collisions or to align the data transmissions).

It should be noted that aspects of this disclosure described in context with the communication terminal 300 described with reference to FIG. 3 are analogously valid for the communication terminal 600 described with reference to FIG. 6 and vice versa.

It should further be noted that according to other aspects of this disclosure, methods according to the communication terminals described with reference to FIGS. 3 and 6 are provided.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication terminal comprising:
   a memory; and
   a selector;
   wherein the memory stores a plurality of subscriber identities assigned to identify the communication terminal, and wherein
   the selector is configured to select one of the subscriber identities depending on a desired timing of a data transmission with respect to a timing of a further data transmission.

2. The communication terminal according to claim 1, comprising a subscriber identity module wherein the subscriber identity module includes the plurality of subscriber identities and wherein the subscriber identities are assigned to identify the communication terminal by being assigned to identify the subscriber identity module.

3. The communication terminal according to claim 2, further comprising an integrated circuit card wherein the subscriber identity module is stored on the integrated circuit card.

4. The communication terminal according to claim 3, wherein the plurality of subscriber identities are stored on a memory of the integrated circuit card.

5. The communication terminal according to claim 1, being a mobile communication terminal.

6. The communication terminal according to claim 1, wherein the selector is configured to select the subscriber identity based on a predetermined criterion.

7. The communication terminal according to claim 1, wherein the selector is configured to select the subscriber identity such that a timing of the data transmission associated with the subscriber identity does not collide with the timing of the further data transmission.

8. The communication terminal according to claim 1, wherein the selector is configured to select the subscriber identity such that a timing of the data transmission associated with the subscriber identity overlaps with the timing of the further data transmission.

9. The communication terminal according to claim 1, wherein at least one of the data transmission is the transmission of system information or paging information.

10. The communication terminal according to claim 1, being a subscriber terminal of a mobile communication network and further comprising a transmitter configured to transmit an indication of the selected subscriber identity to the mobile communication network.

11. The communication terminal according to claim 10, wherein the transmitter is configured to indicate the selected subscriber identity as an identification to be used for the communication terminal in the mobile communication network.

12. The communication terminal according to claim 1, wherein the data transmission is a data transmission between the communication terminal and a first mobile communication network and the further data transmission is a data transmission between the communication terminal and a second mobile communication network.

13. The communication terminal according to claim 12, wherein the first mobile communication network and the second mobile communication network are different.

14. The communication terminal according to claim 13, comprising a subscriber identity module wherein the subscriber identity module includes the plurality of subscriber identities and wherein the subscriber identity module is a subscriber identity module for using the first mobile communication network and comprising another subscriber identity module for using the second mobile communication network.

15. The communication terminal according to claim 1, wherein the timing of a data transmission is associated with the subscriber identity by means of a predetermined rule.

16. The communication terminal according to claim 1, being a subscriber terminal of a mobile communication network in which the timing of a data transmission between the mobile communication network and the communication terminal is determined based on a subscriber identity used for the communication terminal in the mobile communication network.

17. The communication terminal according to claim 1, wherein the subscriber identities are International Mobile Subscriber Identities.

18. A communication terminal comprising
a selector configured to select one of a plurality of subscriber identities based on a predetermined criterion, the predetermined criterion comprising a desired timing of a data transmission with respect to a timing of a further data transmission; and
a transmitter configured to transmit an indication of the selected subscriber identity to a mobile communication network as a subscriber identity to be used as subscriber identity of the communication terminal by the mobile communication network.

19. A method for operating a communication terminal comprising:
storing a plurality of subscriber identities assigned to identify the communication terminal in a memory of the communication terminal; and
selecting one of the subscriber identities depending on a desired timing of a data transmission with respect to a timing of a further data transmission.

20. The method according to claim 19, further comprising transmitting an indication of the selected subscriber identity to a mobile communication network as a subscriber identity to be used as subscriber identity of the communication terminal by the mobile communication network.

21. A method for operating a communication terminal comprising
selecting one of a plurality of subscriber identities based on a predetermined criterion, the predetermined criterion comprising a desired timing of a data transmission with respect to a timing of a further data transmission; and
transmitting an indication of the selected subscriber identity to a mobile communication network as a subscriber identity to be used as subscriber identity of the communication terminal by the mobile communication network.

22. The method according to claim 21, wherein the plurality of subscriber identities are stored in a memory of the communication terminal.

* * * * *